United States Patent
Barnett et al.

(10) Patent No.: US 12,505,230 B2
(45) Date of Patent: Dec. 23, 2025

(54) FRAGMENT AND SHUFFLE ERASURE CODING TECHNIQUE

(71) Applicant: Dell Products L.P., Round Rock, TX (US)

(72) Inventors: Alan Barnett, County Cork (IE); Merry Globin, County Cork (IE); Aidan O Mahony, Cork (IE); Matthew Keating, Cork (IE)

(73) Assignee: Dell Products L.P., Round Rock, TX (US)

( * ) Notice: Subject to any disclaimer, the term of this patent is extended or adjusted under 35 U.S.C. 154(b) by 815 days.

(21) Appl. No.: 17/663,424

(22) Filed: May 14, 2022

(65) Prior Publication Data

US 2023/0367886 A1 Nov. 16, 2023

(51) Int. Cl.
*G06F 21/60* (2013.01)
*G06F 16/11* (2019.01)

(52) U.S. Cl.
CPC .......... *G06F 21/602* (2013.01); *G06F 16/116* (2019.01)

(58) Field of Classification Search
CPC .............................. G06F 21/602; G06F 16/116
See application file for complete search history.

(56) References Cited

U.S. PATENT DOCUMENTS

| | | | |
|---|---|---|---|
| 10,956,375 B2* | 3/2021 | Barnett | G06F 16/137 |
| 2014/0201541 A1* | 7/2014 | Paul | G06F 21/6245 |
| | | | 713/193 |
| 2014/0270164 A1* | 9/2014 | Aggarwal | H04L 9/0816 |
| | | | 380/46 |
| 2018/0232527 A1* | 8/2018 | Haager | H04L 63/0428 |
| 2019/0036648 A1* | 1/2019 | Yanovsky | G06F 16/1752 |
| 2021/0021371 A1* | 1/2021 | Yanovsky | G06F 3/067 |
| 2021/0216625 A1* | 7/2021 | Miller | G06F 21/602 |

OTHER PUBLICATIONS

Stefanov et al., "ObliviStore: High Performance Oblivious Cloud Storage", May 2013, IEEE Symposium on Security and Privacy, pp. 253-267 (Year: 2013).*

* cited by examiner

*Primary Examiner* — Kenneth W Chang
(74) *Attorney, Agent, or Firm* — Workman Nydegger

(57) ABSTRACT

A fragment and shuffle erasure coding operation is disclosed. In a transformative operation, encrypted fragments are generated from an input file. The transformative operation includes one or more iterations of chunking the file and mixing the chunks to generate a mixed sequence. The mixed sequence is sliced into encrypted fragments. The encrypted fragments are shuffled in a storage system such that physical locations of the encrypted fragments change over time.

18 Claims, 8 Drawing Sheets

FRAGMENT AND SHUFFLE ERASURE CODING TECHNIQUE

FIELD OF THE INVENTION

Embodiments of the present invention generally relate to protecting data and storage systems. More particularly, at least some embodiments of the invention relate to systems, hardware, software, computer-readable media, and methods for protecting information in storage systems from events including disasters and malicious attacks.

BACKGROUND

Erasure coding is a method for protecting data. Generally stated, erasure coding is a technique that involves breaking the data into segments and expanding each of the segments. Conventionally, erasure coding is an example of forward error correction that allows the data to be recovered in the event that some of the data is lost. In other words, data is transformed into new data. The new data includes redundancies that allows the original data to be recovered from a subset of the new data.

One of the current problems with erasure coding is that when attacks are carried out against storage infrastructure, a malicious actor may be able to eavesdrop on the network traffic and potentially gain some level of privilege. Eavesdropping on network traffic, including encrypted network traffic, may allow access patterns to be discerned. Simply monitoring the flow of packets may allow the physical storage locations of data (e.g., authentication data) to be inferred. For example, a network traffic analysis may indicate that there is network traffic between a user's machine to a specific server around the same time every day. An eavesdropper may infer that this server is a location for key-management/sign on mechanisms. In addition, if the same user's traffic is to a specific node in a storage cluster, an eavesdropper may infer that the user's data is stored on that specific node. An eavesdropper may be able to make inferences with regard to traffic that is not dependent on human interactions.

If a malicious actor can obtain erasure coding encoded segments, that actor may attempt to decode these segments. If successful, the malicious actor may gain some insight from the information. This is true even where the malicious actor is only able to obtain some of the fragments or segments from one storage node of a multi-node cluster.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection operations. More particularly, at least some embodiments of the invention relate to systems, hardware, software, computer-readable media, and methods for erasure coding including fragment and shuffle erasure coding.

In general, example embodiments of the invention relate to data protection operations, erasure coding operations, data shuffle operations, slicing operations, mixing operations, encrypting operations, fragmenting operations, or the like or any combination thereof.

Erasure coding, by way of example, protects data in storage environments or devices from events such as disasters and physical attacks. Erasure coding is generally performed by segmenting data, encoding and/or encrypting the resulting segments, and then dispersing these segments in a distributed storage environment. These segments can be reassembled and decoded (or decrypted) to obtain the original data. Distributing the segments does not have the same amount or risk associated with data, such as a backup, that is stored as a consolidated file and that presents a single point of failure. When the segments are expanded to introduce redundancy, the original data may be able to be recovered even when some of the segments are lost or erased.

Embodiments of the invention relate to an erasure coding system that protects data in complementary manners. For example, a shuffle index is disclosed that obfuscates the physical storage locations of data segments. This is able to counteract network traffic analysis. As a complement to the shuffling, a ciphertext is generated that includes a set of fragments or segments. These fragments have complete inter-dependence. In other words, the ciphertext can either be decrypted in its entirety or not at all (or very unlikely). A single missing fragment either prevents decryption or multiplies the difficulty in breaking the encryption. This additional complexity essentially requires a physical attack to obtain the entire set of ciphertext fragments or segments in order to attack the encryption.

Figure 1A:
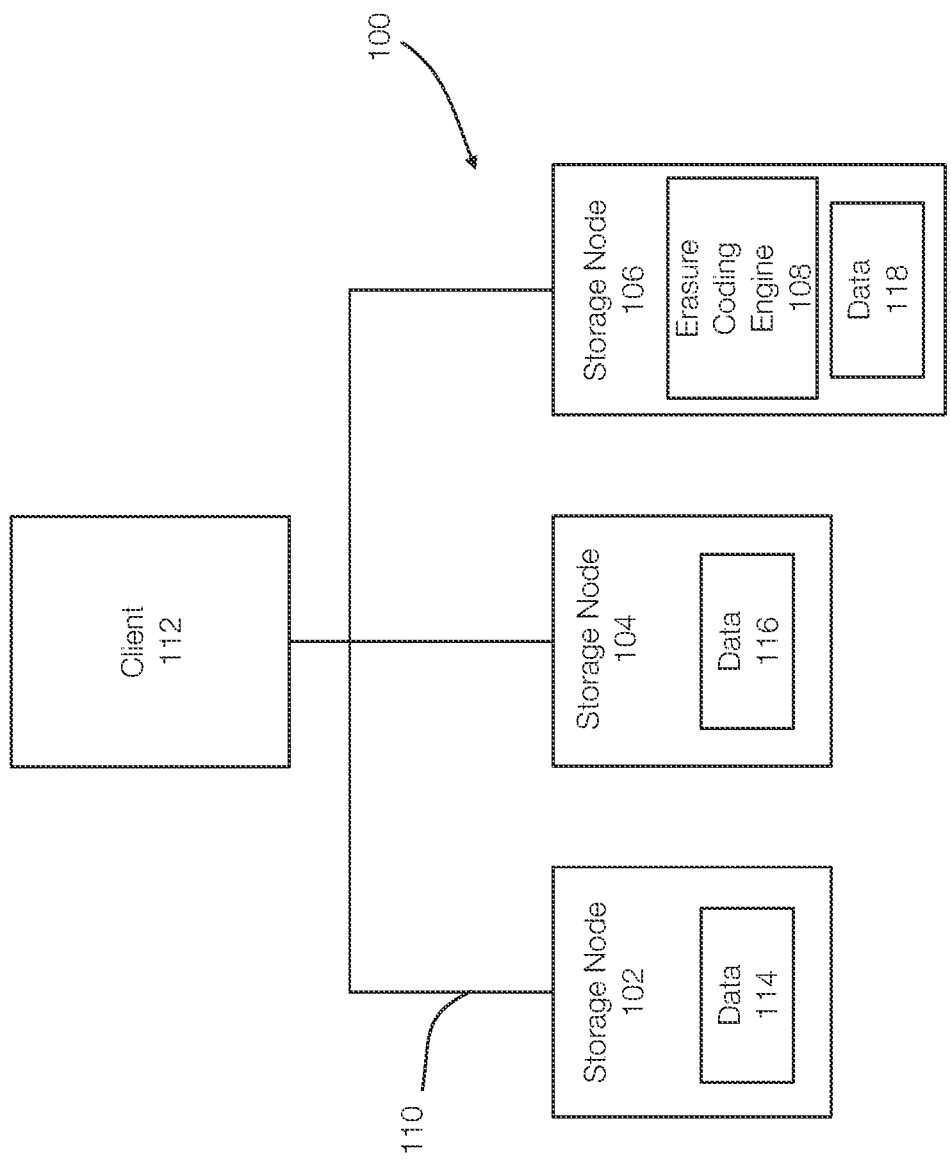
FIG. 1A discloses aspects of centralized erasure coding in a storage system.

FIG. 1A discloses aspects of a storage environment in which erasure coding is implemented. FIG. 1A illustrates an example of a storage cluster 100. The cluster 100 may include multiple nodes and is illustrated as including 3 nodes: storage nodes 102, 104, and 106. Each of these nodes 102, 104, and 106 may be associated with a server or operate as a server. The storage nodes 102, 104, and 106 may include one or more storage devices, such as hard drives.

The storage nodes 102, 104, and 106 may be accessed by multiple client devices or clients, represented by the client 112. The storage nodes 102, 104, and 106 and the client 112 are connected by a network 110. The network 110 may be a wireless and/or wired network and may include local area networks, wide area networks, the Internet, telecommunication networks or the like. In this example, the storage nodes 102, 104 and 106 may be in a private network and are part of the storage cluster 100.

In this example, the erasure coding is centralized with a dedicated server. More specifically, an erasure coding engine 108 is running on the storage node 106 and is configured to provide erasure coding functionality for the storage cluster 100. The erasure coding engine 108, alternatively, could be implemented on a separate machine or device (virtual or real or a container).

The storage node 102 stores data 114, the storage node 104 stores data 116, and the storage node 106 stores data 118. The erasure coding engine 108 operates to perform erasure coding on the data 114, 116, and 118. In some examples, the erasure coding may be performed on less than all of the data. The reasons for performing or not performing erasure coding with respect to a specific object, file or the like may depend on file size, processing/memory requirements, execution time, network bandwidth, or the like.

Figure 1B:
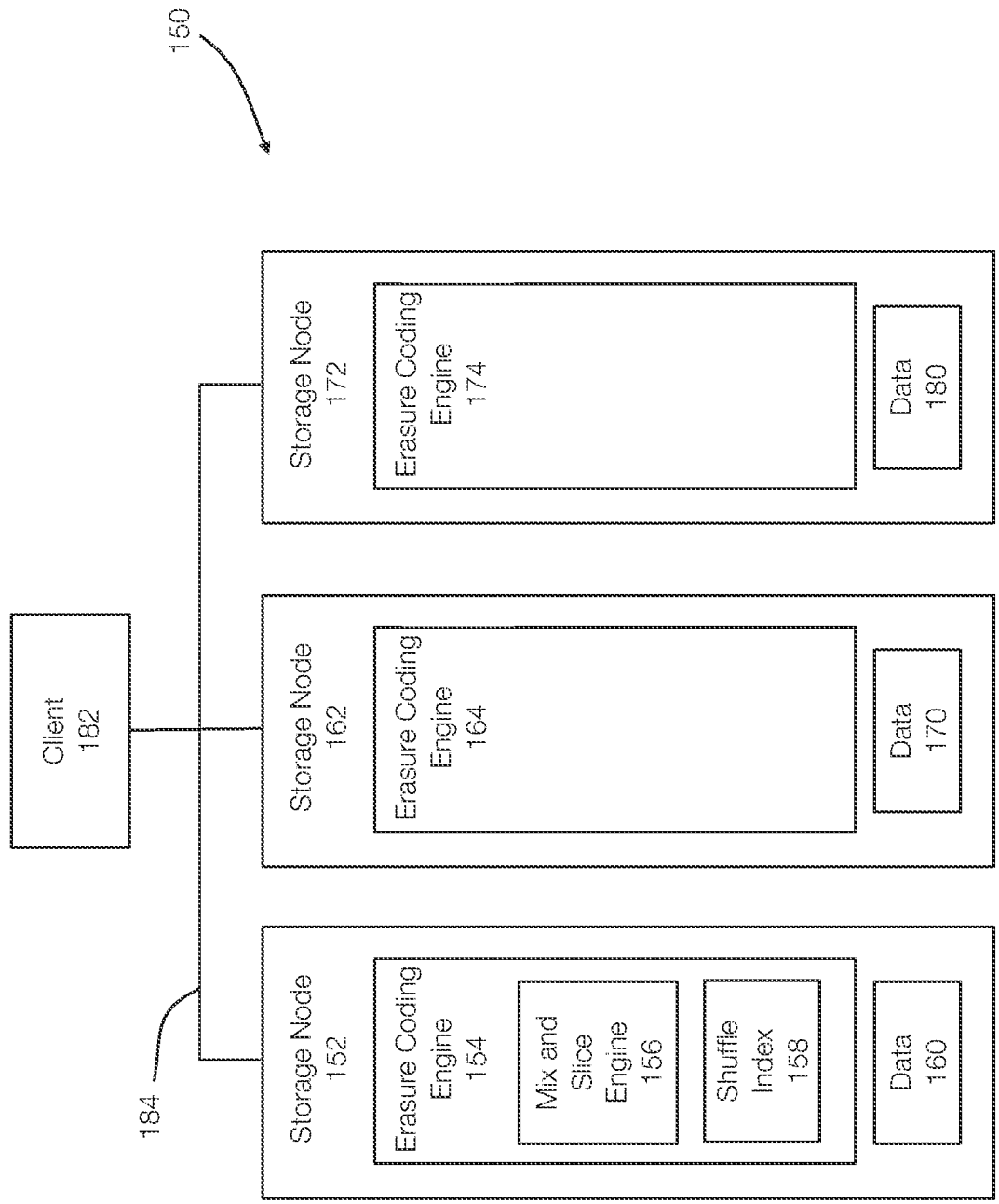
FIG. 1B discloses aspects of distributed erasure coding in a storage system.

FIG. 1B discloses aspects of a storage environment in which erasure coding is implemented. The storage system 150, which is similar to the storage system 100, may include multiple nodes, which are represented by the storage nodes 152, 162, and 172. In this example, each of the storage nodes 152, 162, and 172 includes, respectively, an erasure coding engine 154, 164, and 174. Data 160, 170, and 180 are stores respectively, on the storage nodes 152, 162, and 172.

The erasure coding engine 154 includes a mix and slice engine 156 (or slice engine 156) and a shuffle index 158. The erasure coding engines 164 and 174 are similarly configured. The erasure coding implemented in the system 150 is a distributed architecture that is similar to the distributed architecture of the storage system 150. An instance of the erasure coding engine operates on each node of the system 150 in one example.

This architecture allows the erasure coding engine 154 to operate as a gateway or plugin. The erasure coding engine 154 may be integrated with the storage node 152 to provide encryption and shuffling services or may be an included feature of a data protection system 150 such as a data protection server or appliance.

Figure 2A:
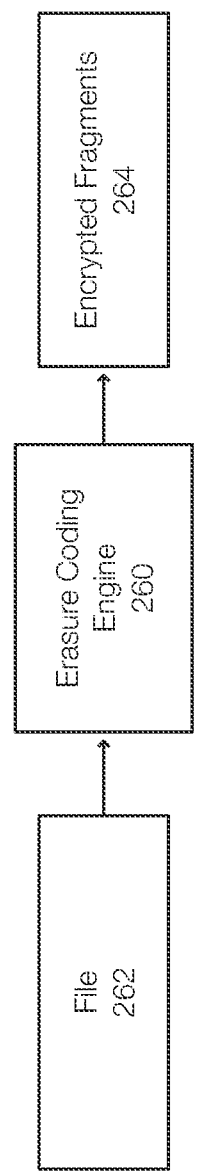
FIG. 2A discloses aspects of erasure coding to generate encrypted fragments from input data.

FIG. 2A discloses aspects of mixing and slicing, which may be performed by erasure coding engine. The erasure coding engine illustrated in FIG. 2A performs a transformative operation or an all-in-one operation that receives a file as input and that outputs encrypted fragments. The transformative operation may perform multiple iterations of chunking and mixing to form a mixed sequence or mixed sequences that can be sliced to generate the encrypted fragments. The encryption occurs as part of the transformative operation.

FIG. 2A illustrates an erasure coding engine 260, which is an example of the erasure coding engines 108, 154, 164, or 174. A file 262 is input into or processed by the erasure coding engine 260. The erasure coding engine 260 performs operations on the file 262 such as slicing, mixing, and/or encryption to generate encrypted fragments 264. More generally, the file 262 is an example of plain text and the encrypted fragments 264 are an example of cipher text.

Figure 2B:
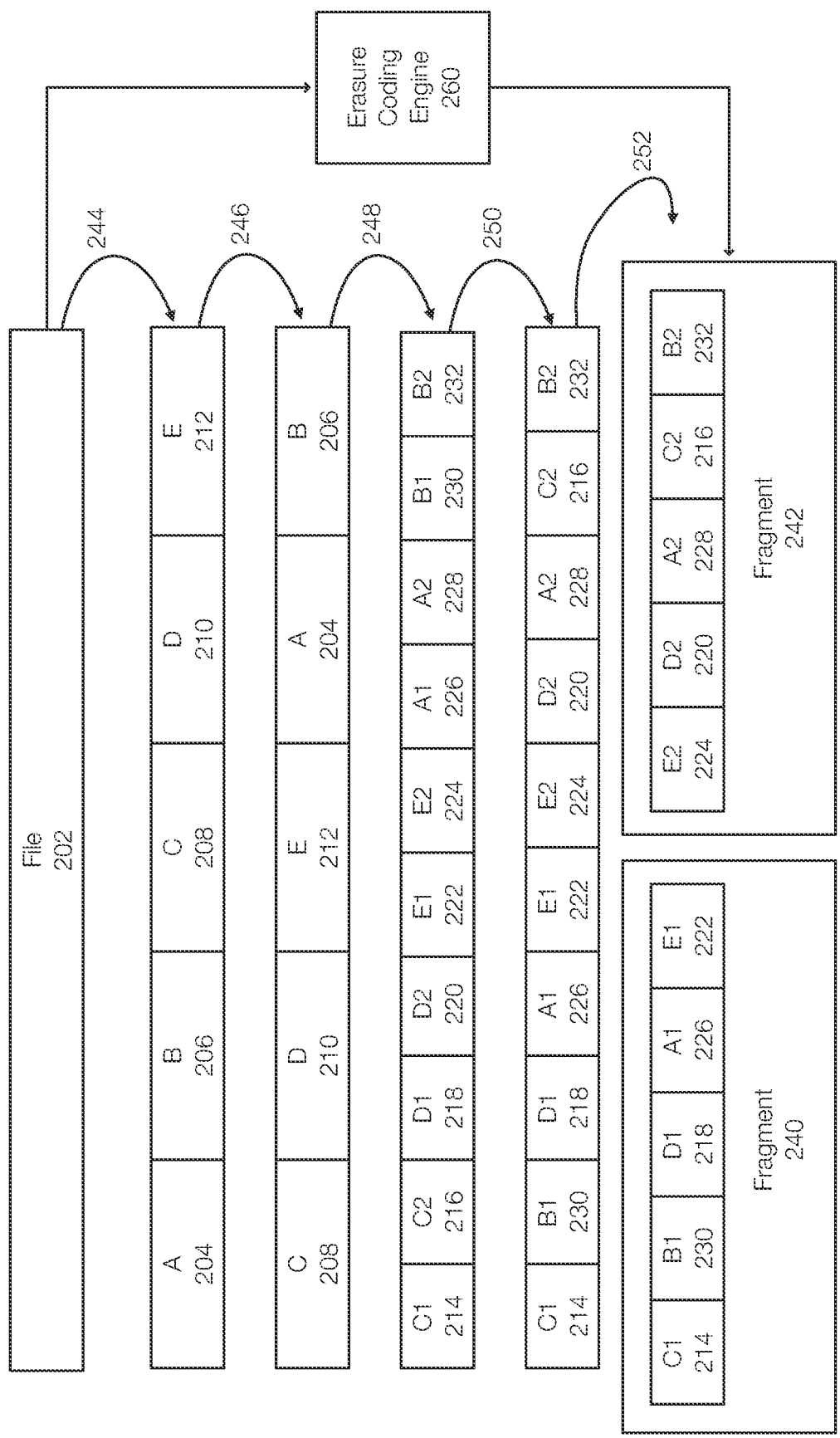
FIG. 2B discloses aspects of erasure coding including mixing, slicing, and encrypting.

FIG. 2B discloses aspects of erasure coding including mixing and slicing. In FIG. 2B, a file 202 is initially chunked 244 into chunks or blocks such as blocks A 204, B 206, C 208, D 210 and E 212. In one example, the blocks 204, 206, 208, 210 and 212 have the same size. If the file does not chunk evenly, one of the blocks may be padded with additional bits.

Next, the blocks are mixed 246. Mixing may include one or more operations of swapping block locations. In this example, the blocks are mixed. The original order was A, B, C, D and E. The mixed order is C, D, E, A and B.

Next, each of the blocks are divided into smaller blocks of equal sizes such as blocks C1 214, C2 216, D1 218, D2 220, E1 222, E2 224, A1 226, A2 228, B1 230, and B2 232. These smaller blocks are mixed 250 to generate data where the smaller blocks have a different order. In this example, the order resulting from mixing 250 is C1, B1, D1, A1, E1, E2, D2, A2, C2 and B2.

In one example, the mixing 250 is performed such that when the blocks are sliced 252 into fragments, each of the fragments includes a portion of each of the original blocks A, B, C, D and E. In this example, slicing 252 results in fragments 240 and 242. The fragment 240 includes blocks C1, B1, D1, A1, and E1 and the fragment 242 includes blocks E2, D2, A2, C2 and B2. Each of the fragments 240 and 242 may include a mix of different blocks. In other words, it is not necessary for each fragment to include the same ordinal block positions. For example, the fragment 240 could include blocks C2, B1, D1, A1 and E1. However, each of the fragments 240 and 242 include a smaller block from one of the initial blocks A, B, C, D and E. In other words, because the initial chunking included blocks A, B, C, D and E, each of the fragments includes a representative from each of these blocks.

In one example, the mixing and slicing process illustrated in FIG. 2B also includes encryption. As a result, the output of the erasure coding engine 260 includes encrypted fragments 240 and 242 that correspond to the file 202.

As previously stated, the mixing performed by the erasure coding engine 260 establishes inter-dependency between the fragments—each fragment includes a portion of each of the initial blocks. As a result, a malicious actor will have extreme difficult breaking the encryption if even a single fragment is missing. The computational hardness against only a portion of the fragments is substantially harder than the difficult task of breaking the encryption when all of the fragments are available.

Figure 2C:
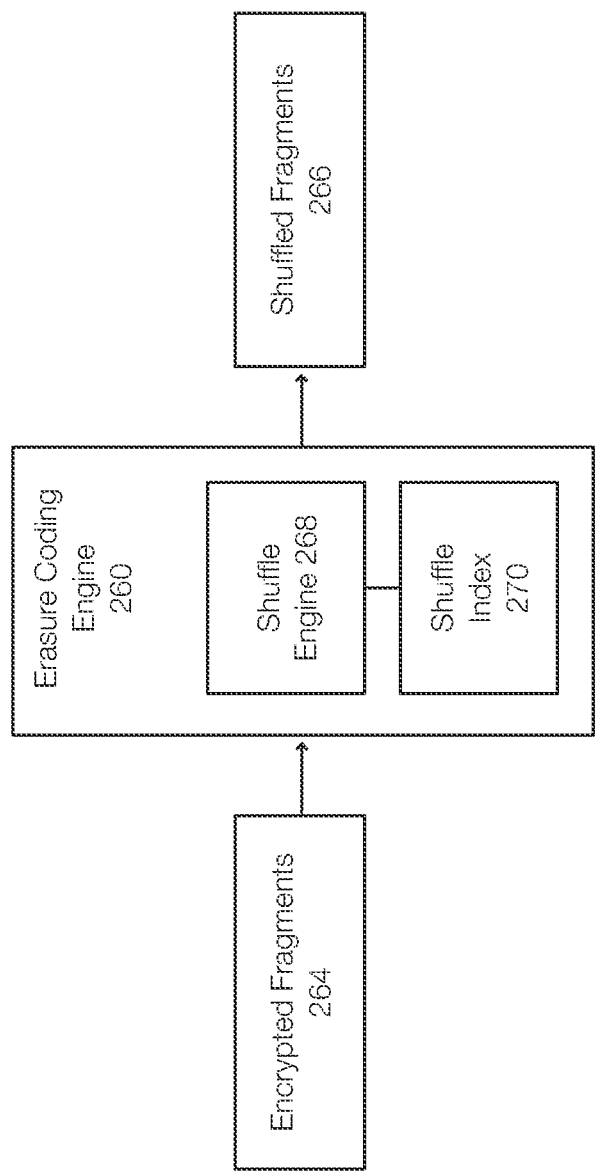
FIG. 2C discloses aspects of shuffling objects including fragments generated by erasure coding operations.

FIG. 2C illustrates additional aspects of erasure coding in accordance with embodiments of the invention. The erasure coding engine 260 may also include a shuffle engine 268. The shuffle engine 268 is configured to shuffle the encrypted fragments 264 that may be stored in the storage system, such as the storage system 100 or 150.

The shuffle engine 268 is configured to obfuscate access patterns and the physical locations of data against techniques such as eavesdropping, traffic analysis and pattern recognition. The shuffle engine 268 creates or performs this obfuscation by performing a shuffle operation. The shuffle operation may be performed in different manners or based on various conditions. For example, the shuffle operation may be performed after a given amount of time, after a given number of accesses, any time data access occurs (this may increase the workload), or the like.

During a shuffle operation, the files or subsets thereof are shuffled around the distributed storage system to new physical locations. However, a logical file system preserves locations in a shuffle index maintained by the shuffle engine. Shuffling the files (or fragments) reduces the effectiveness of traffic analysis and pattern recognition such that the physical locations of data is more difficult to discern. Shuffling in a random or pseudo random manner eliminates the presence of patterns in the network traffic.

The shuffle engine 268 works in conjunction with multiple nodes and access files as any other client. The shuffle engine 268, for example, should be authenticated. Because the shuffle operation may be computationally expensive, large contiguous files may not be subject to the shuffling operation. Smaller files such as hash codes, cryptographic keys, or fragments produced by the erasure coding engine 260 may be shuffled in some embodiments.

As illustrated in FIG. 2C, the shuffle engine 268 may perform a shuffling operation once the encrypted fragments 264 are generated. The shuffling operation can be performed in the storage cluster, however, without requiring the addition of newly encrypted fragments. In other words, the existing data may be shuffled. The shuffle index 270 may store an index of file locations—the locations of the hash codes, keys, fragments, and the like. The shuffle engine 268 may shuffle files across multiple nodes in the storage system.

Figure 3:
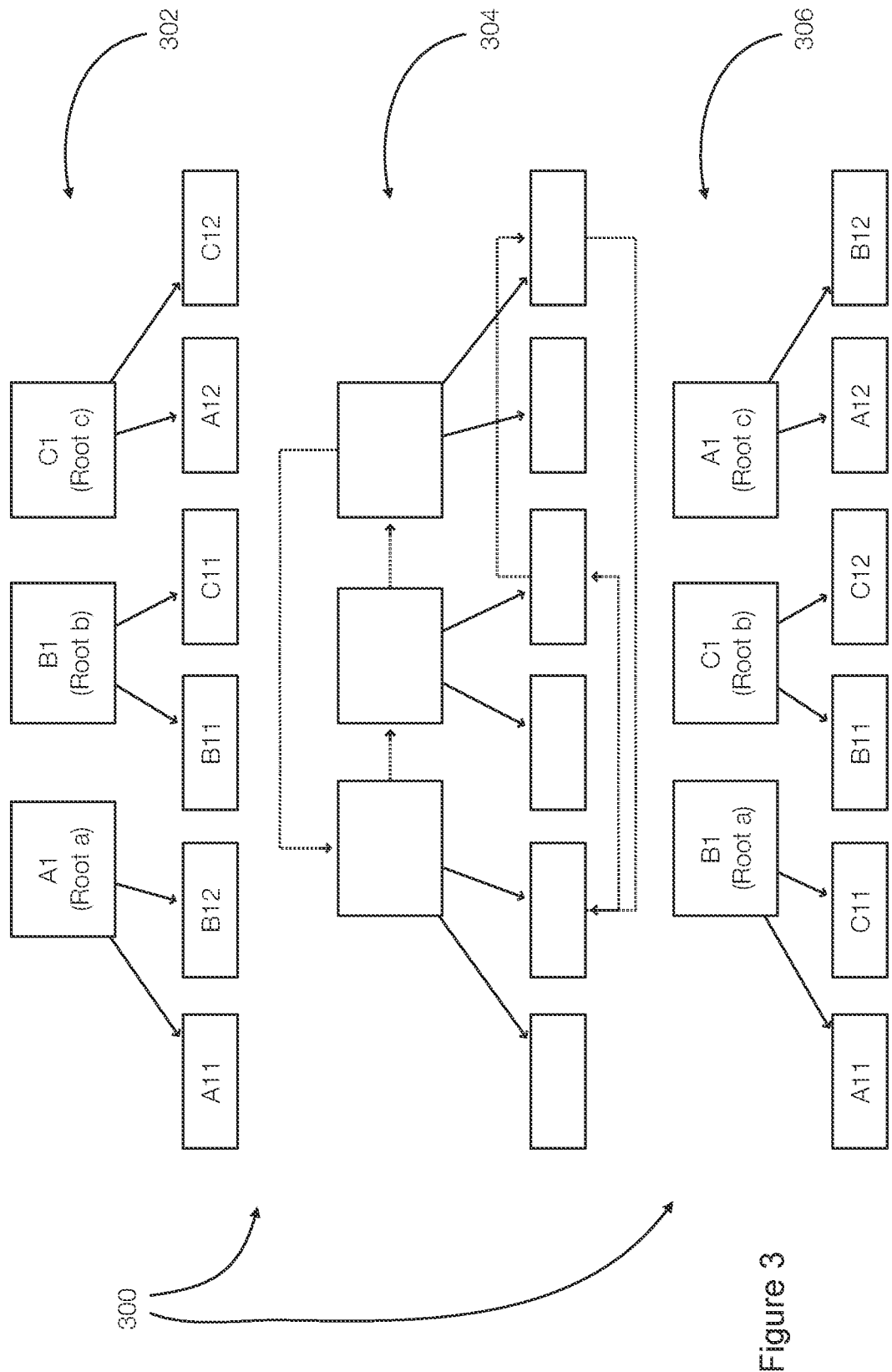
FIG. 3 discloses aspects of a shuffling operation.

FIG. 3 discloses aspects of a shuffle operation. FIG. 3 discloses files (e.g., encrypted fragments, keys, or the like) that are represented by A11, A12, B11, B12, C11, C12. These are associated with roots a, b, and c, represented by A1, B1, and C1. In this example of a root index 302, fragments A11 and B12 are associated with root A1, fragments B11 and C11 are associated with root B1, and fragments A12 and C12 are associated with root C1.

The shuffle operation 300 illustrates a logical index 302 prior to a shuffle or swap operation 304. During a swap or shuffle operation 304, some of the fragments are moved to different physical locations as illustrated by the dotted arrows.

The logical index 306 after the shuffle operation represents the state of the storage after the shuffle operation 304. In the logical index 306, B1 is associated with root a, C1 is associated with root b and A1 is associated with root c. Similarly, fragments A11 and C11 are now associated with B1, fragments B11 and C12 are associated with C2, and fragments A12 and B12 are associated with A1.

In this example, the physical locations of files may change places or be shuffled in another manner. The shuffle index 270, however, preserves logical locations of the data. This ensures that a client can request a file using the same location that may have been previously used. The shuffle index 270 ensures that the actual file, which may be at a different physical location compared to earlier can be retrieved. The shuffle index maintains the file locations.

In order to decrypt the ciphertext, all of the fragments are needed. More specifically, the process of generating encrypted fragments from an input file is an all or nothing transform. This process ensures that each fragment includes a piece of each of the original blocks when the file is blocked the first time. By performing an all or nothing transformation and then storing the encrypted fragments in a distributed and obfuscated fashion makes it difficult to obtain the entire set of fragments needed to reverse the transformation.

Even if one node is breached, less than all of the fragments are on the breached node, thereby securing the data. Further shuffling the data in the storage system amongst the nodes hides or obfuscates probable locations of specific data or components to network traffic analysis eavesdropping, or the like.

Figure 4:
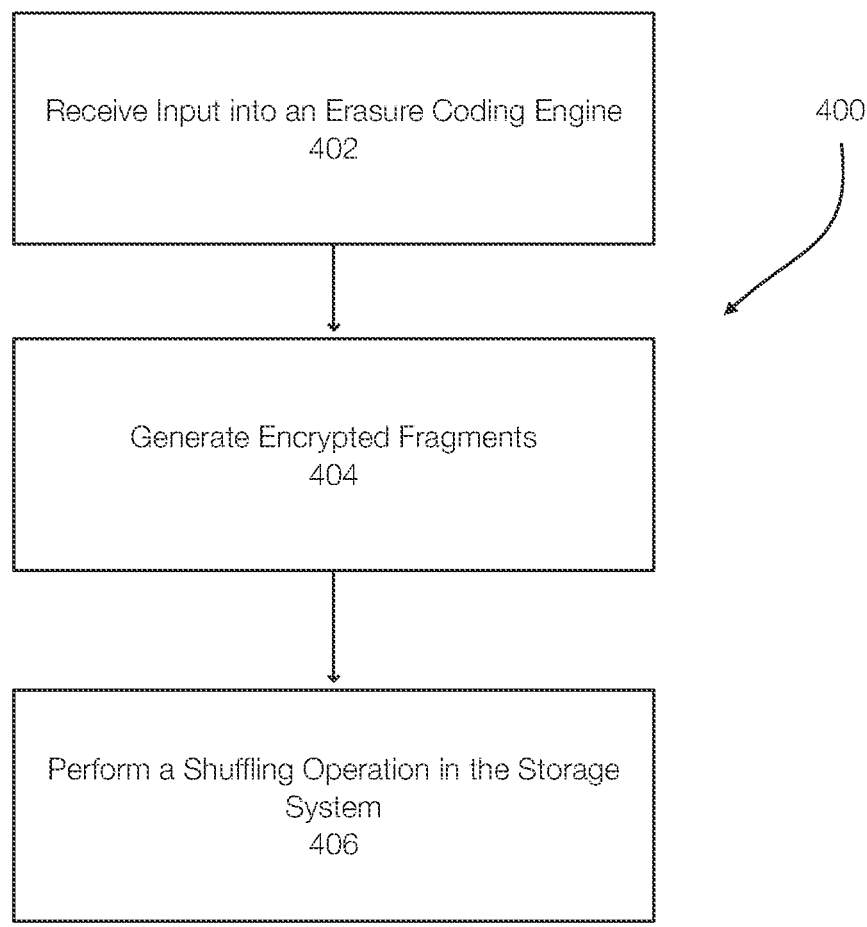
FIG. 4 discloses aspects of an erasure coding method.

FIG. 4 discloses aspects of an erasure coding method. In the method 400, input, such as a file, is received 402 into an erasure coding engine. The erasure coding engine then generates 404 encrypted fragments that correspond to the input. The erasure coding engine performs a transformative operation that generates the fragments and encrypts the fragments in the same process. In other words, the process of generating the fragments and encrypting the fragments are integrated into the transformative operation.

Once the encrypted fragments are generated 404, a shuffling operation is performed 406 in the storage system. The shuffling operation physically shuffles the encrypted fragments to obfuscate network traffic patterns. A logical index maintains the physical locations of the encrypted fragments.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data mixing operations, slicing operations, blocking operations, fragmenting operations, encrypting operations, backup operations, shuffling operations, or the like or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a file into an erasure coding engine, wherein the file is stored in a storage system, generating, by the erasure coding engine, encrypted fragments from the file in a transformative operation that includes chunking the file at least once into chunks, mixing an order of the chunks for each chunking and forming a sequence, and slicing the sequence into the encrypted fragments, and performing a shuffling operation, by the erasure coding engine, to shuffle the encrypted fragments in the storage system to change physical storage locations of at least some of the encrypted fragments.

Embodiment 2. The method of embodiment 1, wherein the transformative operation includes generating first chunks, mixing the first chunks into a first sequence, generating second chunks from the first chunks in the first sequence, and mixing the second chunks into a second sequence.

Embodiment 3. The method of embodiment 1 and/or 2, wherein the transformative operation includes performing encryption.

Embodiment 4. The method of embodiment 1, 2, and/or 3, wherein each of the encrypted fragments includes a piece from each of the first chunks.

Embodiment 5. The method of embodiment 1, 2, 3, and/or 4, further comprising shuffling the encrypted fragments such that the encrypted fragments are stored on multiple storage nodes of the storage system.

Embodiment 6. The method of embodiment 1, 2, 3, 4, and/or 5, wherein the erasure coding engine operates on a specific node in the storage system.

Embodiment 7. The method of embodiment 1, 2, 3, 4, 5, and/or 6, wherein the erasure coding engine includes multiple instances operating at multiple nodes in the storage system.

Embodiment 8. The method of embodiment 1, 2, 3, 4, 5, 6, and/or 7, further comprising shuffling the encrypted fragments to protect against eavesdropping, traffic analysis, and network pattern recognition.

Embodiment 9. The method of embodiment 1, 2, 3, 4, 5, 6, 7, and/or 8, further comprising performing the shuffle operation after generating the encrypted fragments, after a predetermined amount of time, and/or after a number of data accesses in the storage system.

Embodiment 10. The method of embodiment 1, 2, 3, 4, 5, 6, 7, 8, and/or 9, further comprising maintaining a shuffle index that maps logical locations of the encrypted fragments in the storage system to physical locations of the encrypted fragments in the storage system.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine" may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
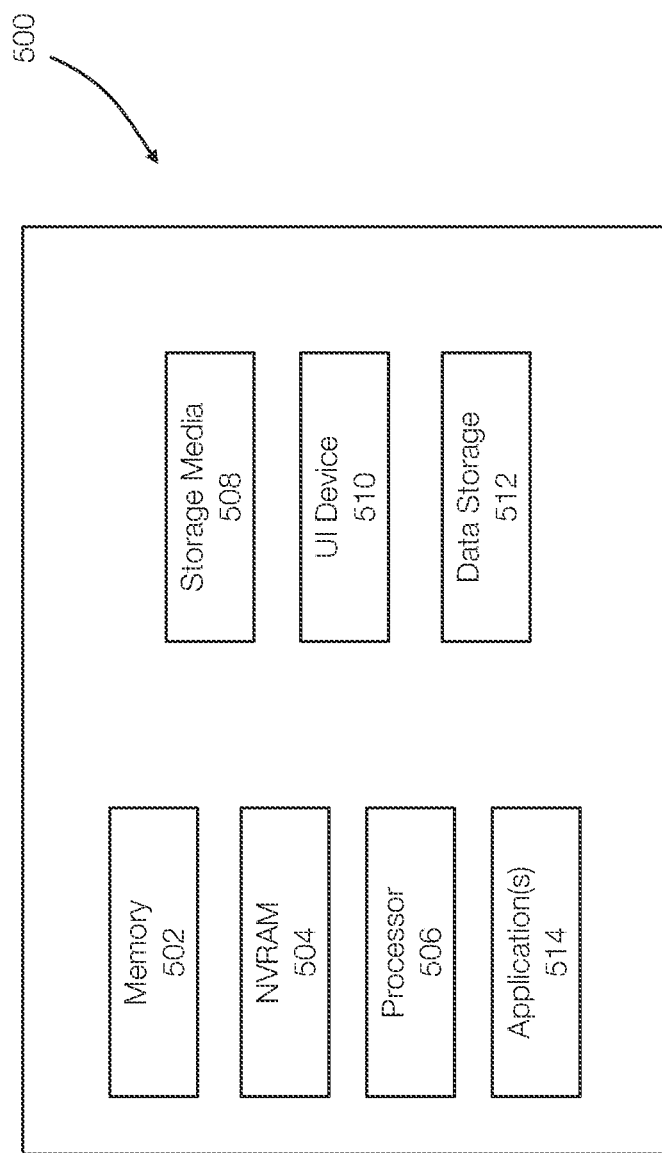
FIG. 5 discloses aspects of a computing system, device, or network.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a file into an erasure coding engine, wherein the file is stored in a storage system;
generating, by the erasure coding engine, encrypted fragments from the file in a transformative operation that includes chunking the file at least once into chunks, mixing an order of the chunks for each chunking and forming a sequence, and slicing the sequence into the encrypted fragments;
performing a shuffling operation, by the erasure coding engine, to shuffle the encrypted fragments in the storage system to change physical storage locations of at least some of the encrypted fragments; and
maintaining a shuffle index that maps logical locations of the encrypted fragments in the storage system to physical locations of the encrypted fragments in the storage system.

2. The method of claim 1, wherein the transformative operation includes generating first chunks, mixing the first chunks into a first sequence, generating second chunks from the first chunks in the first sequence, and mixing the second chunks into a second sequence.

3. The method of claim 2, wherein the transformative operation includes performing encryption.

4. The method of claim 2, wherein each of the encrypted fragments includes a piece from each of the first chunks.

5. The method of claim 1, further comprising shuffling the encrypted fragments such that the encrypted fragments are stored on multiple storage nodes of the storage system.

6. The method of claim 5, wherein the erasure coding engine operates on a specific node in the storage system.

7. The method of claim 5, wherein the erasure coding engine includes multiple instances operating at multiple nodes in the storage system.

8. The method of claim 1, further comprising shuffling the encrypted fragments to protect against eavesdropping, traffic analysis, and network pattern recognition.

9. The method of claim 1, further comprising performing the shuffling operation after generating the encrypted fragments, after a predetermined amount of time, and/or after a number of data accesses in the storage system.

10. A non-transitory storage medium having stored therein instructions that are executable by one or more hardware processors to perform operations comprising:

receiving a file into an erasure coding engine, wherein the file is stored in a storage system;

generating, by the erasure coding engine, encrypted fragments from the file in a transformative operation that includes chunking the file at least once into chunks, mixing an order of the chunks for each chunking and forming a sequence, and slicing the sequence into the encrypted fragments; and performing a shuffling operation, by the erasure coding engine, to shuffle the encrypted fragments in the storage system to change physical storage locations of at least some of the encrypted fragments; and performing the shuffling operation after generating the encrypted fragments, after a predetermined amount of time, and/or after a number of data accesses in the storage system.

11. The non-transitory storage medium of claim 10, wherein the transformative operation includes generating first chunks, mixing the first chunks into a first sequence, generating second chunks from the first chunks in the first sequence, and mixing the second chunks into a second sequence.

12. The non-transitory storage medium of claim 11, wherein the transformative operation includes performing encryption.

13. The non-transitory storage medium of claim 11, wherein each of the encrypted fragments includes a piece from each of the first chunks.

14. The non-transitory storage medium of claim 10, further comprising shuffling the encrypted fragments such that the encrypted fragments are stored on multiple storage nodes of the storage system.

15. The non-transitory storage medium of claim 14, wherein the erasure coding engine operates on a specific node in the storage system.

16. The non-transitory storage medium of claim 14, wherein the erasure coding engine includes multiple instances operating at multiple nodes in the storage system.

17. The non-transitory storage medium of claim 10, further comprising shuffling the encrypted fragments to protect against eavesdropping, traffic analysis, and network pattern recognition.

18. The non-transitory storage medium of claim 10, further comprising maintaining a shuffle index that maps logical locations of the encrypted fragments in the storage system to physical locations of the encrypted fragments in the storage system.

* * * * *